United States Patent [19]

Danko et al.

[11] 4,262,880
[45] Apr. 21, 1981

[54] PLUG VALVE
[75] Inventors: Oliver L. Danko, Chesterland; William C. Steiss, Parma; William H. Amor, Jr., Auburn Twp., Cuyahoga County; William P. Tobbe, Lyndhurst; Thomas J. Gardner, Willoughby; Earl D. Shufflebarger, Mentor, all of Ohio
[73] Assignee: Nupro Company
[21] Appl. No.: 53,549
[22] Filed: Jun. 29, 1979
[51] Int. Cl.³ .............................................. F16K 51/00
[52] U.S. Cl. .................................. 251/288; 251/209; 251/309; 251/317; 251/DIG. 1
[58] Field of Search ............... 251/288, 209, 309, 317, 251/DIG. 1

[56] References Cited
U.S. PATENT DOCUMENTS

| | | | |
|---|---|---|---|
| 1,485,720 | 3/1924 | Sage | 251/317 |
| 1,638,152 | 8/1927 | Gabriel | 251/209 |
| 2,014,642 | 9/1935 | Andrews | 251/75 |
| 2,424,328 | 7/1947 | Pars | 251/209 |
| 2,433,732 | 12/1947 | Brown | 251/DIG. 1 |
| 2,485,915 | 10/1949 | Parker | 251/317 |
| 2,503,639 | 4/1950 | Snyder | 251/113 |
| 2,510,514 | 6/1950 | Mueller | 251/317 |
| 2,547,116 | 4/1951 | Gould | 251/309 |
| 2,578,396 | 12/1951 | Brown | 251/317 |
| 2,604,293 | 7/1952 | Phillips | 251/DIG. 1 |
| 2,628,809 | 2/1953 | Mikeska | 251/317 |
| 2,973,183 | 2/1961 | Alger, Jr. | 251/314 |
| 2,986,367 | 5/1961 | Le Rouax | 251/317 |
| 3,072,379 | 1/1963 | Hamer | 251/317 |
| 3,112,758 | 12/1963 | Norton | 251/288 |
| 3,114,536 | 12/1963 | Demaison | 259/151 |
| 3,133,723 | 5/1964 | Goldman et al. | 251/309 |
| 3,192,948 | 7/1965 | Anderson et al. | 251/288 |
| 3,220,694 | 11/1965 | Eschbaugh | 251/309 |
| 3,325,141 | 6/1967 | Skendrovic | 251/317 |
| 3,497,179 | 2/1970 | Smyers, Jr. | 251/317 |
| 3,508,573 | 4/1970 | Smith | 251/309 |
| 3,540,694 | 11/1970 | Cornelius | 251/209 |
| 3,782,686 | 1/1974 | Cowle | 251/309 |
| 4,010,930 | 3/1977 | Sands | 251/309 |
| 4,171,711 | 10/1979 | Bake et al. | 251/317 |

FOREIGN PATENT DOCUMENTS

| | | | |
|---|---|---|---|
| 205080 | 10/1955 | Australia . | |
| 1033980 | 7/1958 | Fed. Rep. of Germany | 251/209 |
| 1062512 | 7/1959 | Fed. Rep. of Germany | 251/317 |
| 1202564 | 1/1960 | France | 251/317 |
| 1371902 | 8/1964 | France | 251/317 |
| 340681 | 10/1959 | Switzerland | 251/209 |

OTHER PUBLICATIONS

"What You Should Know About O-Rings", by Frank Butler, 6/1966, Hydraulics and Pneumatics Magazine, pp. 109-111.

Primary Examiner—Alan Cohan
Assistant Examiner—H. Jay Spiegel
Attorney, Agent, or Firm—Fay & Sharpe

[57] ABSTRACT

A plug valve having a valve body with a cylindrical plug receiving opening extending therethrough having at least one terminal end thereof outwardly chamfered. Fluid inlet and outlet passageways communicate with the receiving opening and are chamfered at the areas of communication therewith. A plug member includes a cylindrical plug portion closely received in the body receiving opening. This plug portion has a transverse fluid flow passage which is selectively rotatable into and out of alignment with the valve body inlet and outlet passageways. Axially spaced apart circumferential sealing members disposed on both sides of the flow passage prevent fluid flow outwardly of the receiving opening. An inlet passageway sealing means disposed in the plug portion side wall intermediate the opposite flow passage ends sealingly surrounds the passageway in the valve closed position. A fluid relief channel communicating between the flow passage and plug portion side wall relieves fluid pressure through the outlet passageway as the valve is moved to the closed position. The plug portion advantageously includes a thin coating of plastic material for enhancing its fluid sealing relationship with the receiving opening and for improving ease of rotation between the valve opened and closed positions. The plug member is axially retained in position in the receiving opening by a snap ring at one end and by a handle at the other end. The handle is rotatable only between positively defined maximum valve opened and closed positions. Spaced apart circumferential grooves included in the plug portion side wall receive the axially spaced apart sealing members and at least the bottom walls of these grooves are also coated with the plastic material.

10 Claims, 10 Drawing Figures

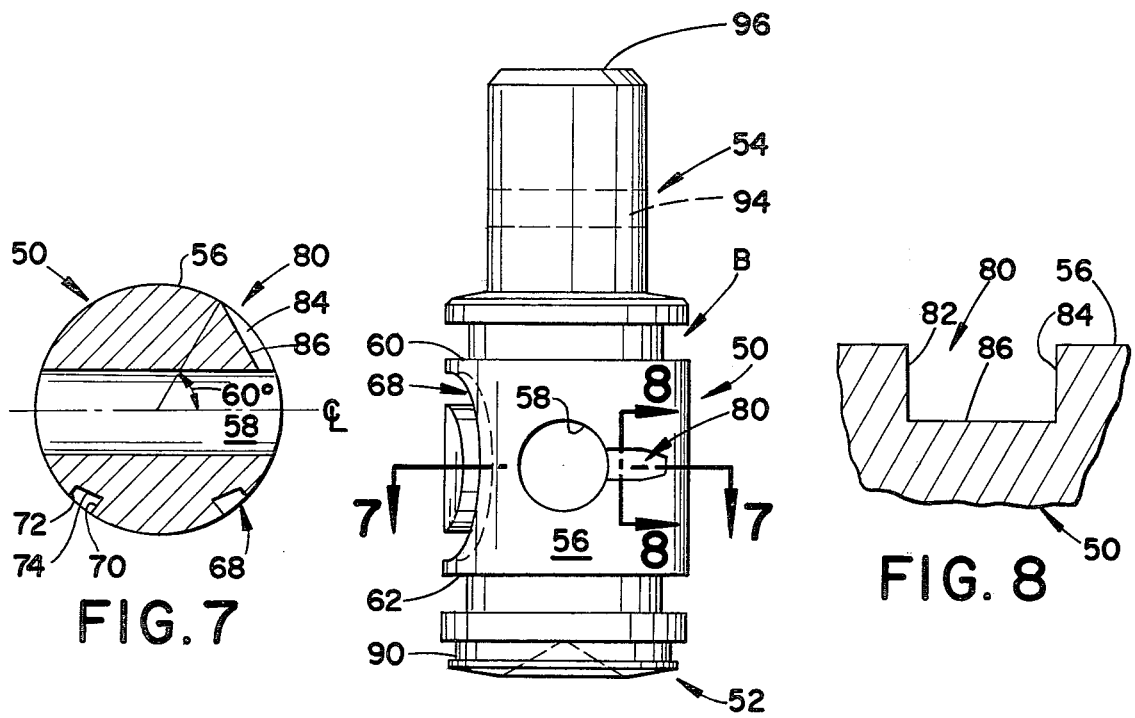
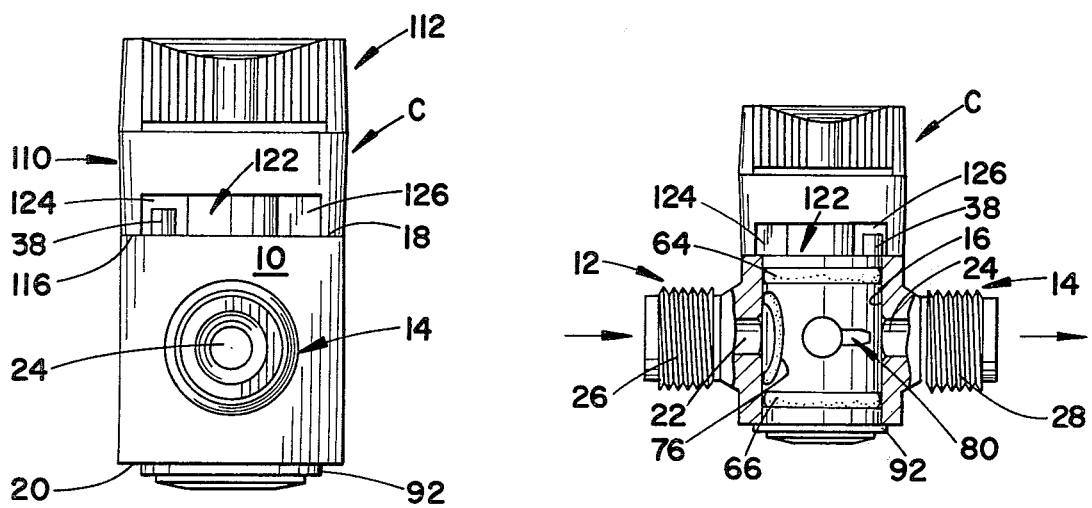

PLUG VALVE

BACKGROUND OF THE INVENTION

This invention pertains to the art of fluid control devices and more particularly to fluid control valves.

The invention is particularly applicable to a so-called plug valve and will be described with particular reference thereto. While the valve is particularly applicable to liquid systems, it will be appreciated that the invention may have application to other environments.

Plug valves of various types and styles are known in the art. Basically, these valves include a valve body having a generally cylindrical plug receiving opening therein adapted to closely receive a plug member. This plug member includes a flow passage extending therethrough and is selectively rotatable in the valve body for purposes of moving the flow passage into and out of alignment with the valve body inlet and outlet passageways. Seal means are disposed at any open end area or end areas of the plug member for preventing fluid bypass outwardly from the valve body receiving opening. In some cases, seal means have also been provided in the plug member to sealingly surround at least the valve body inlet when the valve is moved to a closed condition. In addition, some prior plug valve designs have incorporated various relief opening configurations to facilitate fluid pressure relief when the valve is moved to the closed position. Still other prior plug valves have incorporated coatings or the like on the plug member for reducing the force requirements in rotating the plug member between valve opened and closed positions.

While some prior plug valves have proved successful for selected applications, most have had certain undesirable operational characteristics. These characteristics include valve leakage, complexity of valve design and assembly, blow-out of sealing members when the valves are moved between opened and closed positions, difficulty of movement between valve positions, abrading of the seal members during valve assembly, disassembly and operation, and limitations as to the types of fluid systems in which they could be used. Accordingly, it has been desired to develop a plug valve construction which would overcome the aforementioned particular difficulties and the subject invention is believed to successfully meet these needs.

BRIEF DESCRIPTION OF THE INVENTION

The present invention contemplates a new and improved plug valve construction. Generally, the valve is comprised of a valve body, a plug member and actuating means. The valve body has a generally cylindrical plug member receiving opening extending therethrough which is outwardly chamfered adjacent at least one terminal end thereof. A fluid inlet passageway and a fluid outlet passageway communicate with the receiving opening generally intermediate its terminal ends. Further, each passageway has a generally outward chamfer adjacent its respective area of communication with the receiving opening. The plug member has an elongated generally cylindrical configuration and includes a plug portion closely received in the receiving opening. A flow passage extends generally laterally through the plug portion and is adapted to be selectively rotated into and out of communication with the valve body inlet and outlet passageways. First and second axially spaced apart circumferentially extending grooves are disposed in the plug portion on opposite sides of the flow passage and have first and second sealing members received therein for sealingly engaging the plug member receiving opening side wall. A continuous sealing member receiving groove is disposed in the plug portion side wall generally intermediate the opposite ends of the flow passage and generally intermediate the first and second grooves. This continuous groove has a minimum width dimension across a portion of the plug portion side wall greater than the maximum cross-sectional dimension of the generally outwardly tapered area of the valve body inlet passageway and includes inlet passageway sealing means disposed therein. A fluid pressure relief opening which communicates between the flow passage and the plug portion side wall on the other side of the flow passage from the continuous groove acts to relieve fluid pressure in the valve as the plug member is moved from the valve opened toward the valve closed position. Retaining means cooperating between the plug member and the valve body at each end of the receiving opening releasably retains the plug portion in proper axial position within the receiving opening. The actuating means is fixedly associated with the plug member externally of the receiving opening and permits selective rotation of the plug member between the valve opened and closed positions. When the valve is open, the plug portion flow passage is at least partially aligned with the valve body inlet and outlet passageways. When the valve is closed, the plug portion flow passage is rotated to a position generally intermediate the inlet and outlet passageways with the inlet passageway sealing means moved to a position sealingly surrounding the inlet passageway. Moreover, as the valve is moved from the opened to the closed position, the pressure relief opening passes across the outlet passageway in generally trailing relationship to the plug portion fluid passage. Cooperating means between the actuating means and the valve body positively define maximum valve opened and closed positions. This cooperating means further acts to allow plug member rotation only in predetermined desired directions between these positions.

In accordance with another aspect of the present invention, at least the outside wall of the plug portion is coated with a thin layer of plastic material having a low coefficient of friction. In addition, at least the bottom walls of the first and second axially spaced apart grooves in the plug portion are also coated with plastic material for reducing abrasion on the first and second sealing members when the plug portion is rotated between valve opened and closed positions.

According to another aspect of the present invention, the continuous groove in the plug portion side wall includes inner and outer side walls with a bottom wall extending therebetween. The bottom wall tapers inwardly into the plug portion from the outer side wall toward the inner side wall.

In accordance with yet another aspect of the present invention, a pair of spaced apart plug member support bushings are interposed between the plug portion and the valve body receiving opening to more precisely radially locate and support the plug member therein. The bushings are desirably located axially outward of the first and second circumferential grooves adjacent the receiving opening terminal ends.

In accordance with still another aspect of the present invention, the plug member extends axially outward from terminal ends of the receiving opening. The retaining means includes a circumferentially disposed snap ring receiving groove in the plug member axially outward of one terminal end having a snap ring received therein. The snap ring has an outermost radial dimension sufficient to cooperatively engage the valve body and prevent axial withdrawal of the plug member in one direction therefrom. The actuating means is secured to the plug member adjacent the other receiving opening terminal end for cooperative engagement with the valve body to prevent axial plug member withdrawal in the opposite direction.

According to yet a further aspect of the present invention, the generally outward chamfer of at least the inlet passageway in one structural embodiment has a slightly concave conformation adjacent the area of communication with the receiving opening. In addition, the amount of such concavity preferably varies between maximums and minimums at opposed areas around at least the inlet opening. In another structural embodiment, the generally outward chamfer of at least the inlet passageway has a slightly convex conformation adjacent the area of communication with the receiving opening.

According to yet another aspect of the present invention, the fluid pressure relief opening comprises an elongated groove disposed in the plug portion side wall extending from communication with one of the plug portion flow passage to an area of the plug portion side wall spaced therefrom. The depth of the groove decreases over the longitudinal extent thereof from a maximum depth at its area of communication with the flow passage.

The principal object of the present invention is the provision of a new and improved plug type fluid control valve.

Another object of the invention is the provision of a new and improved plug valve which is simple in design and reliable in practical application.

Still another object of the invention is the provision of a new and improved plug valve which may be utilized in a wide variety of fluid pressure and temperature ranges for a variety of different fluids.

A still further object of the present invention is the provision of a new and improved plug valve which includes means for preventing seal blow-out during valve opening and closing, means for relieving fluid pressure in the valve as it is closed and means to reduce the force required to move the plug member between valve opened and closed positions while also enhancing fluid sealing between the plug portion and receiving opening.

Other objects and advantages will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 6 is a side elevational view of the plug member;

FIG. 7 is a cross-sectional view taken along lines 7—7 of FIG. 6;

FIG. 8 is a cross-sectional view taken along lines 8—8 of FIG. 6;

FIG. 9 is an end view of the subject valve in the valve opened position; and,

FIG. 10 is a side elevational view of the subject valve in partial cross-section showing the relationship between the components in the valve closed position.

DESCRIPTION OF THE PREFERRED EMBODIMENT

Figure 1:
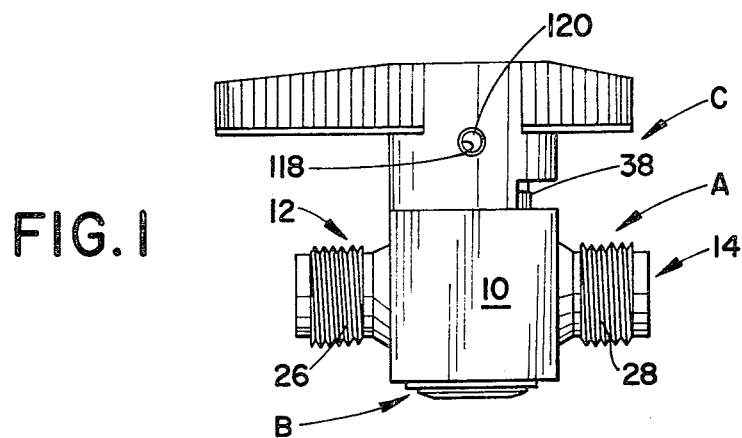
FIG. 1 is a side elevational view of the overall valve construction of the subject invention.

Referring now to the drawings wherein the showings are for purposes of illustrating the preferred embodiment of the invention only and not for purposes of limiting same, the FIGURES show a plug valve comprised of a valve body A, a plug member B and a handle or actuating means C.

More particularly, and with reference to FIGS. 1–5, valve body A is comprised of a body portion generally designed 10 having an inlet branch 12 and an outlet branch 14 which are coaxial with each other. However, it would be possible to locate the branches at other than a coaxial relationship with each other and/or include additional branches in order to have a multi-way fluid control valve. While any number of materials may be suitably employed for body portion 10, stainless steel and brass are preferred with each of these materials having attendant operational limitations and characteristics as will be described hereinafter. A cylindrical plug member receiving bore or opening 16 extends through the body portion from a flat top face 18 to a flat bottom face 20. Because of the overall nature of the valve construction, it is highly desirable that the side wall surface of the bore be highly finished to prevent abrasion damage to the O-ring seals. An ordinary reamed surface will not suffice, particularly where the valve lubricant is dried out due to the action of the system fluid thereon. Therefore, a surface finish for bore 16 on the order of magnitude of 4–8 microinches is advantageously preferred. A fluid inlet passageway 22 extends through inlet branch 12 into communication with plug member receiving bore or opening 16 and a fluid outlet passageway 24 similarly extends through outlet branch 14 into communication with bore or opening 16. In the preferred arrangement here under discussion, passageways 22,24 extend radially outward from plug member receiving bore or opening 16 and have circular cross-sections.

Convenient connecting means generally designated 26,28 are included on inlet and outlet branches 12,14, respectively, for purposes of allowing the valve to be conveniently connected in a fluid system. While tube fitting type connections are shown in the drawings, other ends such as, for example, female pipe ends, male pipe ends, butt weld ends and socket weld ends, may also be advantageously employed without in any way departing from the overall intent or scope of the present invention. In addition, the valve body may include convenient known means (not shown) for fixedly securing the valve to a base, panel or some other attendant fluid system structure. A handle stop or peg 38 extends upwardly from the top face 18 for cooperation with handle C in a manner to be described.

Figure 3:
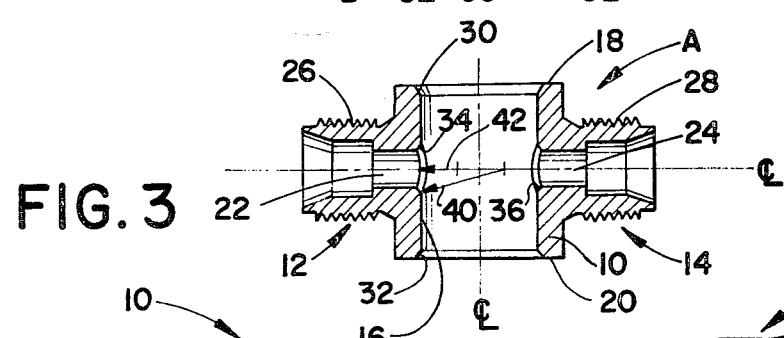
FIG. 3 is a cross-sectional view of the valve body.
Figures 4, 5:
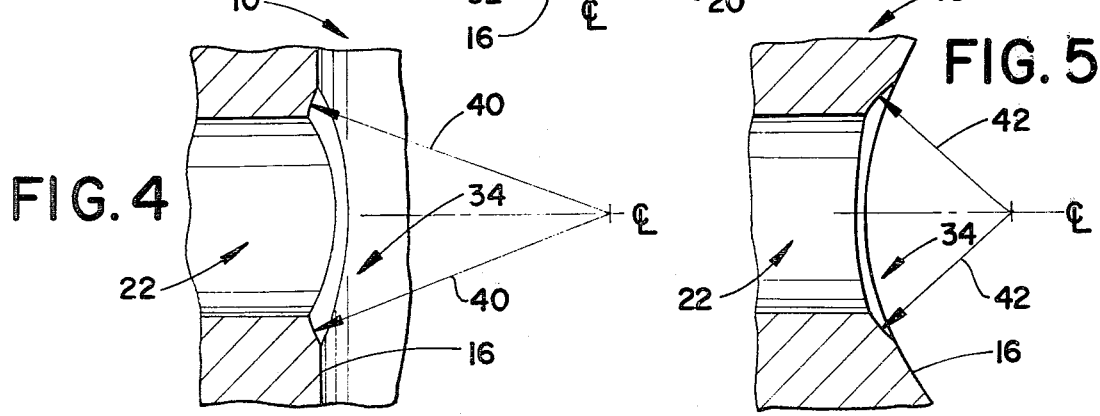
FIG. 4 is an enlarged partial cross-sectional view taken vertically of FIG. 3 through the longitudinal axes of both the inlet passage and valve body receiving opening.
FIG. 5 is an enlarged cross-sectional view taken horizontally of FIG. 3 through the longitudinal axis of the inlet passageway.

With particular reference to FIGS. 3, 4 and 5, plug member receiving bore or opening 16 is advantageously outwardly chamfered with the opposed terminal ends thereof adjacent top and bottom valve body portion faces 18,20. These chamfered areas are generally designated 30,32, respectively. In addition, fluid inlet and outlet passageways 22,24 are generally outwardly chamfered or tapered as at areas 34,36 where the passageways communicate with bore 16. Chamfered areas 30,32,34 and 36 are provided to eliminate undesired O-ring damage such as abrasion or cutting during plug member installation into the valve body and/or during valve operation. These benefits will become more readily apparent in the discussion of valve assembly and operation appearing hereinafter.

In the embodiment shown, chamfered areas 34,36 have concave, radiused conformations. FIGS. 4 and 5 show the conformation of chamfered area 34 in greater detail, it being appreciated that chamfered area 36 is identical thereto unless otherwise specifically noted. The concavity of chamfered area 34 varies therearound between a maximum radius 40 and a minimum radius 42 (FIG. 3) having their centers spaced along the extended centerline or longitudinal axis of inlet passageway 22. The vertical cross-section of FIG. 4 better shows area 34 and maximum radius 40 with the horizontal cross-section of FIG. 5 better showing minimum radius 42. In the arrangement shown, radius 40 is greater than the radius of bore 16 and radius 42 is less than the radius of bore 16. As also shown, chamfered area 34 varies between the maximum and minimum radii at 90° intervals circumferentially therearound. The configuration shown is significant for purposes of better preserving the plug member O-ring type seals during valve assembly and operation as will be described hereinafter. Areas 34,36 are initially made or formed with a recessing tool and then advantageously finished with a type of electro-chemical or electro-discharge machining.

An alternative conformation for chamfered areas 34,36 comprises a convex, radiused configuration. Here too, the radii of curvature will normally vary around each of areas 34,36. This alternative conformation is desirable or significant in that it enhances the transition of the plug member O-ring type seals across inlet and outlet passageways 22,24 during valve assembly and operation.

Referring now to FIGS. 2 and 6-8, description will hereinafter be made with reference to plug member B. In FIG. 6, this plug member is shown as including a cylindrical plug portion 50, a locking extension area 52 and an elongated stem 54. The plug member may be advantageously constructed from any number of materials, although stainless steel and brass are preferred. Extending transversely through side wall 56 of plug portion 50 is a fluid flow passage 58. This passage is dimensioned and located so that when the valve is assembled, the passage may be rotated into and out of coaxial communication with passageways 22,24 (FIG. 2) to control fluid flow through the valve. The dimensional relationship between plug portion cylindrical side wall 56 and the side wall of cylindrical bore or opening 16 is desirably a fairly close fitting one, although there is some spacing therebetween to isolate the plug portion from contact with the bore. In the preferred arrangement, a maximum difference on the order of magnitude of approximately 0.003" between the diametral dimensions of these side walls is deemed desirable. In addition, some constructions for the valve desirably incorporate a thin coating of plastic material (not shown) over the entirety of side wall 56. The coating has a low coefficient of friction for reducing the force required to rotate the valve between opened and closed conditions. The plastic coating also advantageously aids in preventing undesired fluid flow between the plug portion and receiving bore or opening. In the preferred arrangement, the plastic material comprises polytetrafluoroethylene and has a thickness on the plug portion side wall of approximately 0.5–0.7 mils.

Figure 2:
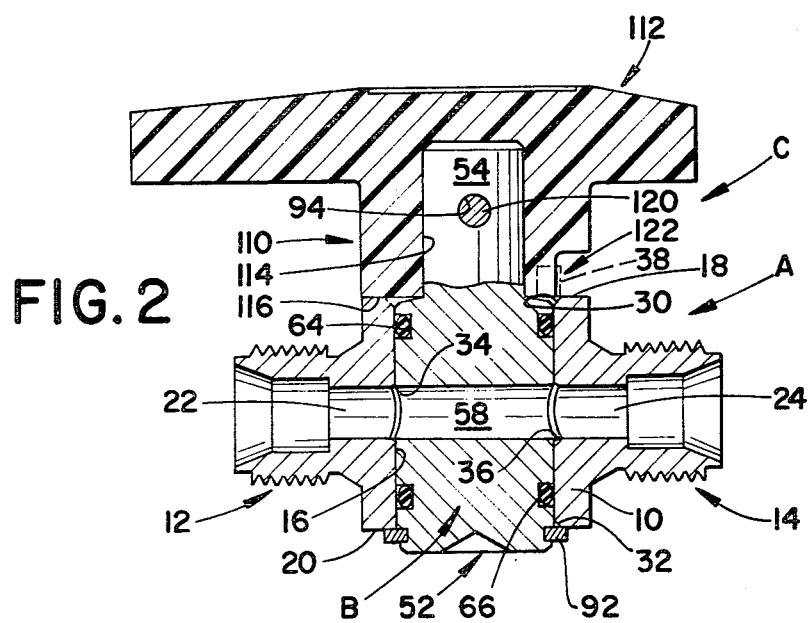
FIG. 2 is an enlarged cross-sectional view of the valve of FIG. 1.

A pair of O-ring receiving grooves 60,62 extend circumferentially of plug portion 50 adjacent the end areas thereof on opposite sides of fluid flow passage 58. When plug portion 50 is properly located in bore 16, these grooves are located axially adjacent the bore terminal ends (FIG. 2). Grooves 60,62 receive O-ring sealing members 64,66, respectively, for purposes of preventing undesired fluid by-pass between plug portion 50 and receiving bore 16. While these O-rings may be constructed from any number of materials, VITON (E. I. Dupont de Nemours and Company) and Buna-N rubber are preferred.

In a valve construction where plug cylindrical portion side wall 56 includes a thin coating of plastic material, it has been found that the effective life of O-rings 64,66 can be improved. More particularly, the side and bottom walls of grooves 60,62 are also preferably coated with plastic material. Since the coefficient of friction of the plastic material is less than the coefficient of friction of plug member receiving bore 16 in body portion 10, O-rings 64,66 will tend to be placed in a sliding relationship with grooves 60,62 when the plug member is rotated relative to the body portion for opening and closing the valve. In other words, the O-rings will tend to remain generally stationary relative to receiving bore 16 as the plug portion is rotated therein. As a result, the abrading type of action which otherwise might occur is substantially reduced and/or eliminated.

As a practical matter, and in coating plug portion side wall 56 with plastic material such as polytetrafluoroethylene, the material is sprayed onto the plug portion in a direction generally normally to the side wall. To enhance adhesion of the plastic material to side wall 56, the generally smooth machined surface qualities thereof are roughened by convenient means such as sandblasting or the like. When the plastic material is sprayed onto side wall 56 in a direction generally normal thereto, the opposed side wall areas of grooves 60,62 may not be entirely coated with the plastic. To compensate for this possibility, the groove side walls are advantageously masked during any roughening process directed to plug portion side wall 56. This then allows the groove side walls to at least still have relatively smooth surfaces in the event they are not entirely coated with plastic so they will not abrade O-rings 64,66 to any substantial degree during valve operation. The plastic coating on at least the bottom walls of grooves 60,62 will provide a sufficient surface area having a low coefficient of friction to assure that the above noted desirable results will be at least generally obtained.

As best shown in FIGS. 6 and 7, a circular O-ring receiving groove 68 is included in side wall 56 generally intermediate the opposite ends of fluid flow passage 58 and generally intermediate O-ring receiving grooves 60,62. For reasons which will become apparent, the inside diameter of the groove is at least slightly greater than the diameter of inlet passageway 22 at chamfered area 34. This O-ring receiving groove is defined by an inner side wall 70, an outer side wall 72 and a bottom wall 74 (FIG. 7). Moreover, bottom wall 74 tapers inwardly into plug portion 50 from the outer side wall toward the inner side wall. An O-ring type seal generally designated 76 in FIG. 10 is closely received in groove 68 and is constructed from a material similar to or the same as that used for O-rings 64,66. The relative depths of groove side walls 70,72 and the tapered nature of groove bottom wall 74 aid in retaining O-ring 76 therein during valve plug movement between valve opened and closed positions.

FIGS. 6-8 best show a fluid pressure relief groove 80 having a generally rectangular cross-section and communicating between one end of fluid flow passage 58 and plug portion side wall 56 on the other side of opening 58 from receiving groove 68. This relief groove is defined by a pair of side walls 82,84 with the innermost wall 86 therebetween defining the groove bottom or depth. Groove 80 extends laterally of side wall 56 and decreases in depth over its longitudinal extent from the end thereof communicating with passage 58. As will become more readily apparent hereinafter, the pressure relief groove is important when the valve is moved to a closed position in order to eliminate the potential for O-ring blow-out. In the preferred arrangement here under discussion, the end of groove 80 spaced from passage 58 is located at an angle of approximately 60° from the centerline or longitudinal axis of opening 58 when measured about the longitudinal axis of plug portion 50. It should also be appreciated that other configurations for groove 80 may also be advantageously employed without departing from the overall intent of the present invention. For example, a generally V-shaped groove would provide satisfactory operational results.

Referring particularly to FIGS. 2 and 6, plug member B is dimensioned so that locking extension area 52 extends axially outward from one end of plug member receiving bore 16. This locking extension area includes a circumferential groove 90 adapted to receive a conventional snap ring member 92. The snap ring, in turn, is dimensioned so that at least the outer radial area thereof may cooperatively engage bottom face 20 of body portion 10. This then helps position the plug portion in the receiving bore and prevents undesired axial withdrawal of the plug member upwardly through receiving bore 16. A stainless steel snap ring is preferred. The plug member is further dimensioned so that elongated stem 54 extends axially outward from receiving bore 16 oppositely from locking extension area 52. The stem includes a handle mounting pin receiving opening 94 extending transversely therethrough. Further, the stem outermost end 96 may advantageously include a generally centrally located handle locating protrusion (not shown).

Description of handle or actuating means C will hereinafter be made with particular reference to FIGS. 1, 2, 9 and 10. Specifically, the handle includes a mounting portion 110 and an elongated handle portion 112. While the overall handle may be constructed from any number of materials, a phenolic plastic is deemed preferable because of the ease with which it may be molded, its heat resistance and its high strength. However, for valve applications which may be exposed to elevated temperatures or so-called rough applications such as in corrosive environments, salt water and the like, a metal handle constructed from aluminum or the like would be more desirable.

As best shown in FIG. 2, mounting portion 110 includes a cylindrical stem receiving opening 114 dimensioned to be closely received over elongated plug member stem 54. The handle mounting portion also includes a flat lower face 116 adapted to cooperatively engage flat top face 18 of body portion 10. This relationship aids in positioning plug portion 50 in bore 16 and prevents axial withdrawal of the plug member downwardly through the receiving bore. A handle mounting opening 118 (FIG. 1) extends transversely through mounting portion 116 and is adapted to be placed in coaxial alignment with stem handle mounting and receiving opening 94 when the handle is properly positioned on the stem. An elongated mounting pin 120 such as a roll pin or the like is closely received in aligned openings 94,118 for retaining the handle on the stem and preventing relative rotation therebetween. Stem receiving opening 114 may also advantageously include a receiving pocket (not shown) at the bottom wall thereof to accommodate any locating protrusion included on outermost end 96 of stem 54.

As best shown in FIG. 2, mounting portion 110 includes a recessed area 122 extending inwardly from the side wall thereof adjacent lower face 116. Spaced apart from each other in and on opposite sides of this recessed area are handle stop surfaces 124,126 (FIGS. 9 and 10). These two surfaces are coplanar with each other and cooperate with handle stop pin 38 in body portion 10 to limit plug member rotation in the valve body between maximum valve opened and closed positions. In the preferred arrangement, pin 38 and surfaces 124,126 are located so that plug member rotation between the maximum valve opened and closed positions is 90°.

With particular reference to FIGS. 2, 9 and 10, description will hereinafter be made to assembly and operation of the subject plug valve. In FIG. 2, chamfered areas 30,32,34 and 36 are advantageously provided to eliminate any abrasion or cutting of O-rings 62,64, and 66 when the plug member is axially inserted into body portion receiving bore or opening 16. Since there is very close sealing relationship between these o-rings and the side wall of the bore, any such abrasion or cutting may result in undesired and unacceptable valve leakage. If it is anticipated that the plug member will only be inserted into and withdrawn from bore 16 from the same terminal end thereof either during initial valve assembly or during subsequent disassembly and reassembly for maintenance purposes, it is possible to eliminate the chamfered area at the other bore terminal end. In addition to the above noted advantage of chamfered areas 30,32,34 and 36 at valve assembly and disassembly, at least chamfered area 34 aids in preventing any abrasion or cutting to O-ring type seal 76 during valve plug rotation between the valve opened and closed positions. Moreover, the alternative convex, radiused conformation for chamfered areas 34,36 facilitates a smoother transition of the O-ring type seals across the valve inlet and outlet passageways during valve assembly and disassembly. Likewise, the convex radius on at least chamfered area 34 provides a smooth transition for seal 76 during valve plug rotation. The specific concave or convex conformations for areas 34,36 as described above, wherein said chamfered openings have inner edges positioned inwardly away from the periphery of the valve body opening whereby abrading of the continuous seal on the edges as the continuous seal moves thereacross is avoided, have been found to provide particularly good operational results in this regard.

FIG. 2 shows the valve in its fully opened position with fluid flow passage 58 of plug portion 50 in coaxial alignment with inlet and outlet passageways 22,24. In this position of the valve, handle stop surface 124 is in engagement with handle stop pin 38 (FIG. 9). Also in this position, and as best seen in FIG. 7, O-ring receiving groove with seal 76 is disposed intermediate the inlet and outlet passageways. When it is desired to close the valve, it is merely necessary to rotate handle C by means of handle portion 112 to effect rotation of the plug member and plug portion 50 in receiving bore or opening 16. Because of the relationship between pin 38 and handle stop surfaces 124,126, such rotation may only be in one direction. The valve closed position is shown in FIG. 10 with handle stop surface 126 engaging pin 38.

As the plug portion is rotated from the valve opened to the valve closed position, fluid flow passage 58 is moved from its position of alignment with inlet and outlet passageways 22,24 to a position generally intermediate thereof. Simultaneously, O-ring type seal 76 is moved to a position surrounding the inlet pasageway in sealing engagement with the side wall of bore or opening 16. Also, as the valve is moved toward the closed position, relief groove 80 passes across outlet passageway 24 in a trailing relationship to fluid flow passage 58. This feature allows fluid pressure on the downstream side of plug portion 50 to be relieved to the outlet passageway as the valve is closed and the plug portion is pushed downstream toward outlet passageway 24 by upstream fluid pressure. Without this feature, a pressure surge exerted by trapped downstream fluid would tend to blow out the O-ring type seals as the valve is reopened. When the valve is in its fully closed position as shown in FIG. 10, relief groove 80 is rotated to a position spaced from communication with outlet passageway 24. The relationship between handle stop surfaces 124,126 and handle stop pin 38 is such that O-ring type seal 76 is only movable between a sealing and non-sealing relationship with inlet passageway 22 and relief groove 80 is only movable between a relieving and non-relieving relationship with outlet passageway 24.

With the above described preferred structural arrangement, a valve constructed from brass may be readily useable in fluid systems of up to 3000 psi. A like valve constructed from stainless steel may be readily useable in fluid systems of up to 3000 psi. With the VITON type O-rings or seals, the fluid system temperatures may have an upper limit of approximately 400° F. and with the Buna-N type O-rings or seals, the upper temperature limit would be approximately 300° F.

One possible modification for the above described preferred embodiment is the inclusion of annular bearings between plug portion 50 and receiving opening 16 adjacent the opening terminal ends axially outward of O-rings 64,66. This type of construction may find particularly advantageous use in so-called dirty fluid systems and allows additional radial clearance to be provided between the side walls of valve body receiving opening 16 and plug member plug portion 50. Moreover, the bearings themselves are spaced from fluid passing through the valve and are desirably prevented from being wetted thereby.

In this modification, the end areas of the plug portion are machined to receive the bearings in a press-fit relationship. While the bearings would typically be constructed from bronze, some plastic materials could also be advantageously employed when the valve is to be used in a corrosive fluid environment. Such bearings would provide better centering for plug portion 50 and may allow relief groove 80 to be eliminated due to a more rigid restraint being provided for the plug portion within receiving bore or opening 16. This rigid restraint prevents the plug portion from being driven far enough downstream when the valve is closed to cause any O-ring blow-out problems during valve reopening. When bushings are employed, a clearance of approximately 0.001" between the bushing outside diameters and the side wall of bore 16 is contemplated.

The invention has been described with particular reference to the preferred embodiment. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A plug type valve comprising: a valve body having a generally cylindrical plug member receiving opening therethrough between opposite actuating and locking end faces, fluid inlet and outlet openings communicating with said opening generally radially thereof, a plug member including a generally cylindrical plug portion rotatably received in said valve body opening and having an outer surface, opposite actuating and locking ends, and a lateral flow passage therethrough with inlet and outlet ends, circumferential seal receiving grooves in said outer surface adjacent said actuating and locking ends, seals received in said seal receiving grooves and being in sealing engagement with the periphery of said plug member receiving opening, said locking end of said plug portion extending outwardly beyond said locking face on said valve body and having a circumferential snap ring groove therein removably receiving a snap ring extending outwardly in overlapping relationship to said locking end face, a continuous groove in said outer surface intermediate said seal receiving grooves and said inlet and outlet ends, a continuous seal received in said continuous groove and being in sealing engagement with the periphery of said valve body opening, said continuous seal encompassing a closed seal area for sealingly surrounding said inlet passageway, a pressure relief groove extending generally circumferentially of said plug portion from said outlet end of said flow passage over a small arc in said outer surface located on the opposite side of said inlet and outlet ends from said continuous groove, said outer surface of said plug portion being smooth and ungrooved adjacent said inlet and outlet ends of said flow passage except for said pressure relief groove, a manual actuator on said plug member at said actuating end and including a generally flat actuator face extending outwardly beyond said plug portion outer surface in overlapping relationship to said actuating end face on said valve body, said actuator face having a recess therein with opposite recess ends defining stop surfaces, a projection on said valve body extending into said recess for cooperation with said stop surfaces to limit rotation of said valve body between a closed position in which said continuous seal surrounds said inlet passageway and an open position in which said inlet and outlet ends of said flow passage are in fluid communication with said inlet and outlet passageways, said pressure relief groove passing across said outlet passageway subsequent to complete movement of said inlet end past said inlet passageway during movement of said plug portion from said open position toward said closed position, and said recess and projection cooperating for providing complete insertion of said plug portion through said valve body opening for positioning a snap ring in said snap ring groove only when said plug portion is properly rotatably oriented for insuring alignment of said continuous seal in surrounding relationship with said inlet passageway and of said inlet and outlet ends respectively with said inlet and outlet passageways when said plug portion is rotated between said closed and open positions.

2. The valve as defined in claim 1 wherein said outer surface of said plug portion between said circumferential seal receiving grooves is roughened for good adhesion of a coating thereto and is coated with a thin layer of plastic material having a smooth outer surface and a low coefficient of friction, said circumferential seal receiving grooves being smooth and unroughened and being at least partly coated with said plastic material.

3. The valve as defined in claim 2 wherein said valve body plug receiving opening has a longitudinal axis and said inlet and outlet passageways enter said plug receiving opening at outwardly chamfered inlet and outlet openings, said inlet and outlet passageways having centerlines substantially intersecting said axis, each said inlet and outlet opening having opposite portions on opposite sides of said centerlines in directions parallel to said axis which are outwardly chamfered about a first radius intersecting each said centerline, and each said inlet and outlet opening having opposite portions on opposite sides of said centerlines in directions around said axis which are outwardly chamfered about a second radius intersecting each said centerline and being substantially smaller than said first radius, said chamfered openings having inner edges positioned inwardly away from the periphery of the valve body opening whereby abrading of the continuous seal on the edges as the continuous seal moves thereacross is avoided.

4. The valve as defined in claim 1 wherein said continuous groove has generally parallel inner and outer side walls and a bottom wall, said inner wall having a depth greater than said outer wall and said bottom wall being out of perpendicular relationship to said inner and outer walls by being sloped away from said plug portion outer surface in a direction from said outer wall toward said inner wall.

5. A body for a plug type valve comprising: a valve body including a generally cylindrical plug receiving opening therethrough having a longitudinal axis, generally circular inlet and outlet passageways extending generally radially of said axis and entering said plug receiving opening at outwardly chamfered inlet and outlet openings, said passageways having centerlines substantially intersecting said axis, each said inlet and outlet opening having opposite portions on opposite sides of said centerlines in directions parallel to said axis which are outwardly chamfered about a first radius intersecting each said centerline, and each said inlet and outlet opening having opposite portions on opposite sides of said centerlines in directions around said axis which are outwardly chamfered about a second radius intersecting each said centerline and being substantially smaller than said first radius, said chamfered openings having inner edges positioned inwardly away from the periphery of the valve body opening whereby abrading of the continuous seal on the edges as the continuous seal moves thereacross is avoided.

6. The valve body of claim 5 wherein said first radius is longer than the radius of said plug receiving opening and said second radius is shorter than the radius of said plug receiving opening.

7. A plug member for a plug valve comprising: an elongated generally cylindrical plug portion having an outer surface and opposite stem and locking ends, circumferential seal receiving grooves adjacent said stem and locking ends, seals received in said seal receiving grooves, a circumferential snap ring receiving groove in said outer surface between said locking end and said seal receiving groove which is adjacent said locking end, a lateral flow passage through said plug portion intermediate said seal receiving grooves and having inlet and outlet ends, a continuous groove in said outer surface intermediate said seal receiving grooves and intermediate said inlet and outlet ends, said continuous groove having generally parallel inner and outer side walls and a bottom wall, said inner side wall having a depth greater than the depth of said outer groove side wall such that said groove bottom wall tapers inwardly away from said plug portion outer surface in a direction from said outer groove side wall toward said inner groove side wall and does not extend perpendicular to either of said groove side walls, a continuous seal received in said continuous groove and encompassing a closed seal area for sealingly surrounding an inlet passageway in a plug valve body, a pressure relief groove in said outer surface extending from said outlet end of said flow passage over a short circumferential arc on the opposite side of said outlet end from said continuous groove, said outer surface being smooth and ungrooved adjacent said inlet and outlet ends of said flow passage except for said pressure relief groove, an integral stem extending outwardly from said stem end, a handle secured to said stem and having a generally flat face extending generally radially outwardly beyond said outer surface of said plug portion, a recess in said flat face for receiving a projection on a valve body, said recess having opposite stop surfaces spaced over an arc for cooperation with a projection on a valve body to limit rotation of said plug member over an angle generally the same as the angle between the center of said closed seal area and the center of said inlet end of said flow passage, and said recess and stop surfaces having a predetermined relationship to said inlet and outlet ends and said continuous seal for insuring proper installation of said plug portion in a plug body.

8. The plug member of claim 7 wherein said outer surface between said circumferential seal receiving grooves is coated with a thin layer of plastic material having a low coefficient of friction, said outer surface between said circumferential seal receiving grooves being roughened for enhancing adhesion of said plastic material thereto, and said circumferential seal receiving grooves being at least partially smooth and unroughened and being at least partly coated with said plastic material.

9. The plug member of claim 7 wherein said plug portion has a longitudinal axis and said outlet end of said flow passage has a centerline intersecting said axis, said pressure relief groove extending from said flow passage outlet end to a pressure relief groove end, a reference line extending from said axis to said pressure relief groove end forming an included angle of approximately 60° with said centerline.

10. A plug type valve comprising: a valve body having a generally cylindrical plug member receiving opening extending therethrough, fluid inlet and outlet passageways communicating with said opening generally radially thereof, a plug member including a generally cylindrical plug portion rotatably received in said valve body opening and having a lateral flow passage therethrough with inlet and outlet ends, said plug portion having an outer surface, a continuous groove in said outer surface intermediate said inlet and outlet ends, a continuous seal received in said continuous groove and engaging the peripheral surface of said valve body opening, said continuous seal encompassing an area greater than the area of said inlet passageway at said valve body opening, said plug member being rotatable between a closed position in which said continuous seal surrounds said inlet passageway for blocking flow therethrough and an open position in which said inlet and outlet ends of said flow passage are in fluid flow communication with said inlet and outlet passageways, said continuous groove having generally parallel inner and outer groove side walls and a groove bottom wall, said inner side wall having a depth greater than the depth of said outer wall such that said groove bottom wall tapers inwardly away from said plug portion outer surface in a direction from said outer groove side wall toward said inner groove side wall and is not perpendicular to either of said groove side walls.

* * * * *